(12) United States Patent
LaFrance-Linden et al.

(10) Patent No.: US 8,504,943 B2
(45) Date of Patent: Aug. 6, 2013

(54) DISPLAYING GROUP ICONS REPRESENTING RESPECTIVE GROUPS OF NODES

(75) Inventors: David C. P. LaFrance-Linden, Bedford, MA (US); Howard S. Rifkin, Croydon, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1778 days.

(21) Appl. No.: 11/585,497

(22) Filed: Oct. 24, 2006

(65) Prior Publication Data
US 2008/0098332 A1    Apr. 24, 2008

(51) Int. Cl.
*G06F 3/048* (2006.01)
(52) U.S. Cl.
USPC .......................................... 715/837; 715/846

(58) Field of Classification Search
USPC .................................................. 715/835–838
See application file for complete search history.

(56) References Cited

U.S. PATENT DOCUMENTS

| | | | | |
|---|---|---|---|---|
| 5,535,403 | A * | 7/1996 | Li et al. .......................... | 715/853 |
| 6,643,613 | B2 * | 11/2003 | McGee et al. ................. | 702/186 |
| 6,952,208 | B1 * | 10/2005 | Arquie et al. .................. | 345/440 |
| 6,952,688 | B1 * | 10/2005 | Goldman et al. ............... | 706/45 |
| 7,454,488 | B2 * | 11/2008 | Wechter et al. ................ | 709/223 |
| 2003/0045315 | A1 * | 3/2003 | Vasa .............................. | 455/517 |
| 2003/0188294 | A1 | 10/2003 | Balle et al. | |
| 2005/0060657 | A1 | 3/2005 | DeLuca et al. | |
| 2006/0031848 | A1 | 2/2006 | Balle et al. | |

* cited by examiner

*Primary Examiner* — Sara England

(57) ABSTRACT

Information is displayed regarding an arrangement of nodes coupled by a communications network. The nodes are associated with corresponding characteristics. Plural groups of the nodes are defined based on the characteristics associated with the nodes. Group icons representing the respective groups of nodes are displayed.

18 Claims, 7 Drawing Sheets

DISPLAYING GROUP ICONS REPRESENTING RESPECTIVE GROUPS OF NODES

BACKGROUND

To manage or to monitor information associated with nodes (e.g., computer nodes, storage server nodes, web server nodes, application server nodes, and so forth), graphical user interface (GUI) software can be used to present a GUI window that displays icons representing the nodes. Typically, information about the nodes is displayed with the corresponding icons. For small-scale arrangements of nodes (that have relatively small numbers of nodes), icons representing the nodes can be effectively viewed in a GUI window. A relatively small number of icons can easily fit within a GUI window displayed by a display device. However, as the number of nodes increase, then even tiny icons will have trouble fitting in a large GUI window. Attempting to fit a large number of icons representing corresponding nodes into a GUI window will cause clutter in the GUI window, and prevent the user from easily identifying information associated with any specific node. Moreover, with small icons, the amount of information associated with each icon that can be displayed is reduced such that the user will unlikely be able to view any meaningful information regarding any node.

Some conventional GUI tools represent each node as a "blob" in which just one piece of information associated with the corresponding node is presented, which denies the user the ability to simultaneously view other information associated with nodes. Also, other conventional GUI tools provide for scrolling to allow the display of larger icons; however, having to scroll to different parts of a display window does not allow the user to view the entire arrangement of icons representing corresponding nodes.

BRIEF DESCRIPTION OF THE DRAWINGS

Some embodiments of the invention are described with respect to the following figures.

DETAILED DESCRIPTION

Figure 1:
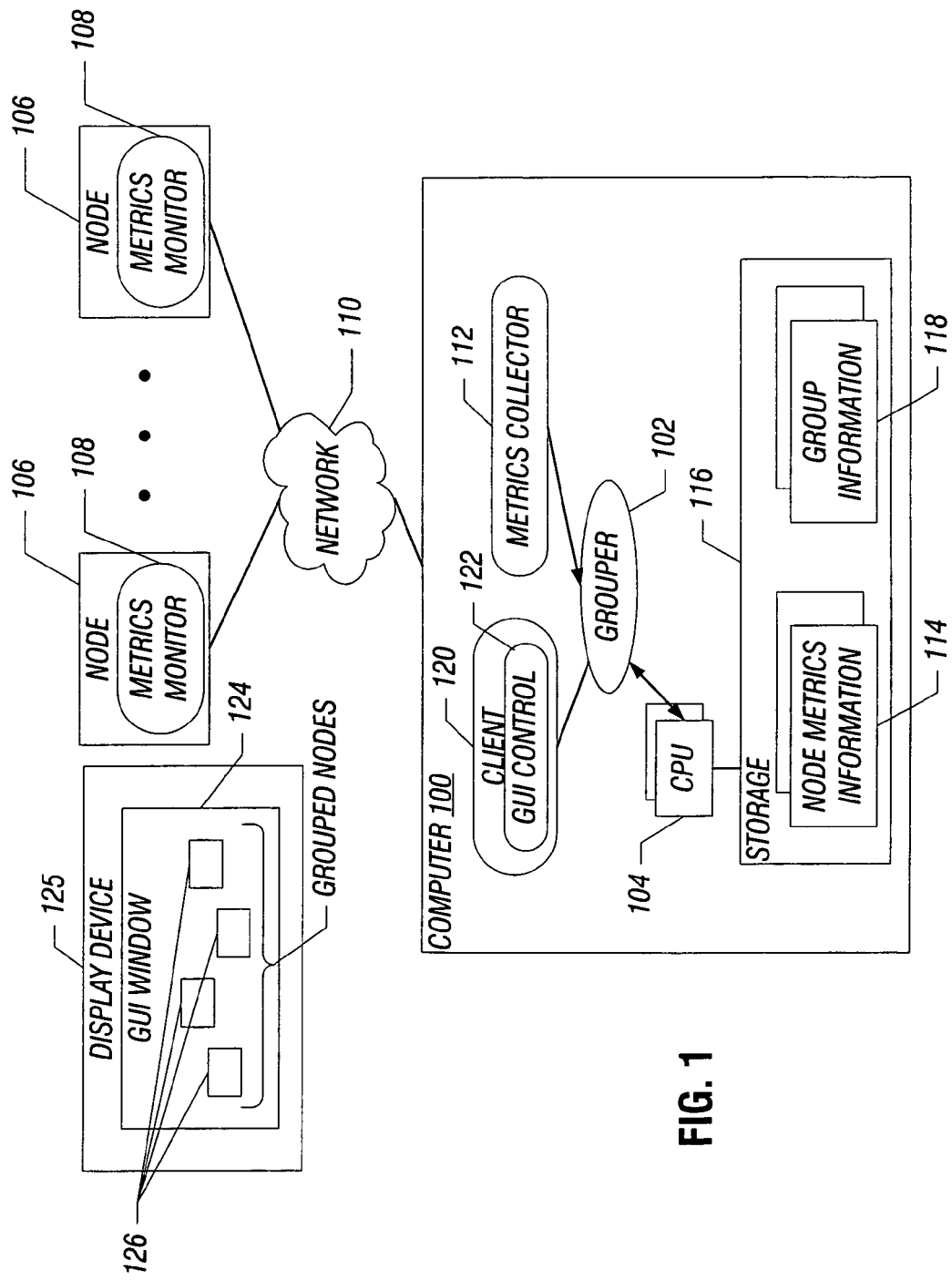
FIG. 1 is a block diagram of an arrangement that includes a computer and a display device, where the display device contains a graphical user interface (GUI) window to display group icons representing corresponding groups of nodes, in accordance with an embodiment.

In accordance with some embodiments, a grouping technique is used to allow group icons to be displayed in a graphical user interface (GUI) window associated with a tool that is used to monitor and/or manage an arrangement of nodes. Examples of nodes include computers, storage devices, switches, routers, and so forth. The group icons represent corresponding groups of nodes, where the nodes are grouped based on characteristics associated with the nodes. In one embodiment, the characteristics associated with the nodes include metrics associated with the nodes, where a metric can include any one or more of the following: central processing unit (CPU) utilization; utilization of network interconnect bandwidth for read accesses; network interconnect bandwidth utilization for write accesses; memory utilization; network interface controller utilization; storage interconnect bandwidth utilization for read accesses; storage interconnect bandwidth utilization for write accesses; and other metric information. Grouping based on metrics of the nodes refers to grouping based on whether differences between one or more of the metrics are within predefined tolerance(s). Although reference is made to multiple metrics, it is noted that grouping can alternatively be based on just one metric.

Other characteristics of nodes that can be used for grouping include one or more of the following: types of software applications run by the nodes; whether the node is operating as a master or a slave; number of CPUs in each node; or some other characteristic. In one implementation, these latter characteristics are actually used to identify different classes of nodes, with grouping of nodes being performed within each class of nodes. For example, nodes running the same type of software application can be considered to be part of the same class. Alternatively, nodes operating as masters are classified in one class, whereas nodes operating as slaves are classified in another class. In yet another example, the number of CPUs in each node determines the class of the node (e.g., nodes having one CPU can be classified in one class; nodes having two CPUs can be classified in another class, and so forth). In another example, nodes are divided into a computing node class and an administrative node class. Computing nodes can be nodes that perform primary computing tasks, whereas administration nodes are nodes that are used to perform various administrative tasks with respect to the computing nodes. In other examples, classification can be based on bus speeds, types of interconnect, and so forth. As noted above, grouping of nodes occurs within each class; for example, if there are two classes (A and B) of nodes, then class A nodes can be grouped into one or more groups, and class B nodes can be grouped into one or more groups. Thus, in some embodiments, two levels of partitioning can be performed to perform grouping, with a first level of partitioning to partition nodes into different classes, and a second level of partitioning to group nodes within each class. In other embodiments, separation of nodes into different classes is not performed. Note also in another implementation a user is able to pre-select the nodes of interest as the arrangement for which grouping is to be performed.

Using the techniques above, nodes that are doing "roughly the same thing" are able to be grouped into a grouped node, where group icons are used to represent corresponding grouped nodes to allow a user to quickly identify differences, disparities, and/or anomalies associated with the various grouped nodes.

The grouping of the nodes can evolve over time due to changing characteristics of the nodes. Membership of each group can change, where the membership change includes evicting individual nodes from a group, or adding individual nodes to a group. Also, during operation, additional groups can be created, and groups can be combined by subsuming one group into another group.

The concept of grouping nodes based on metrics associated with the nodes assumes that nodes performing similar activities will have similar metrics and thus can be collected into grouped nodes. By grouping the nodes, a smaller number of group icons have to be displayer in a GUI window, which allows the group icons to more easily fit into the GUI window. The smaller number of displayed group icons allows the user to more easily view information associated with the grouped nodes and to perform various management tasks. Each group icon displayed in the GUI window can have a representative name and can contain group metrics that represent some aggregation of the metrics associated with the individual nodes. The aggregation can include one or more of the following: average, median, minimum, maximum, mode (most frequent metric value), and range (the maximum and minimum metric values within the group). Also, a membership count can be displayed with the group icon to indicate the number of members in the group. A user can select (by use of an input device such as a mouse or keyboard) the group icon to allow the user to expand the group into individual icons representing individual nodes, such as in some portion of the GUI window or in a pop-up window. Alternatively, selecting the group icon can bring up more detailed information regarding the corresponding group of nodes.

FIG. 1 illustrates an example arrangement that includes a computer 100 on which a grouper 102 is executed. The grouper 102 is a software module (or software modules) executable on one or more central processing units (CPUs) 104 of the computer 100. The grouper 102 is used to define groups of nodes 106 that are part of an arrangement of nodes 106 (e.g., a cluster of nodes, a network of nodes, etc.). The nodes 106 are coupled by a communications network 110 (e.g., a local area network, a wide area network, the Internet, etc.). Each node 106 is associated with a metrics monitor 108 to monitor metrics associated with the respective node, including any of the metrics mentioned above. The metrics monitor 108 communicates collected metrics information over the communications network 110 to the computer 100. The metrics information received from metrics monitors 108 are collected by a metrics collector 112 in the computer 100, which can also be implemented as software executable on the CPU(s) 104. The node metrics information is stored as information 114 in a storage 116 of the computer 100, where the storage 116 can be volatile memory (e.g., dynamic random access memory or static random access memory) or persistent storage (e.g., a disk-based persistent storage).

The defined groups are stored as group information 118, also in the storage 116. The group information 118 can also include aggregated metrics, membership count, and other information associated with corresponding grouped nodes.

The computer 100 further includes client software 120 that is executable on the one or more CPU(s) 104, where the client software 120 includes a GUI control module 122 to control the display of a GUI window (or multiple GUI windows) 124 in a display device 125 attached to the computer 100. The client software 120 receives information from the grouper 102, and the GUI control module 122 controls the display of group icons 126 in the GUI window 124. Information displayed with the group icons 126 can be extracted from the group information 118, including aggregated metrics, membership count information, and other information relating to the grouped nodes. Also, if display of metrics associated with individual nodes is desirable, such as in response to clicking of a particular group icon (or selection of a menu control item in the GUI window 124), then the node metrics information 114 stored in the storage 116 can be accessed to display such information in the GUI window 124 (or in some other window such as a pop-up window).

Figure 2A:
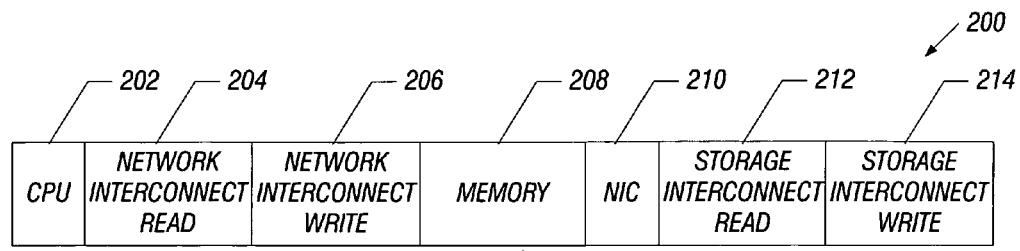
FIG. 2A illustrates a tuple associated with a corresponding node, where the tuple contains several metrics that are associated with the node.

FIG. 2A shows an example tuple 200 associated with a node (an individual node). The tuple 200 includes several entries corresponding to different metrics, which in the example are utilizations of different resources of a node. The example tuple 200 includes an entry 202 to store CPU utilization, an entry 204 to store network interconnect bandwidth utilization for read accesses, an entry 206 to store network interconnect bandwidth utilization for write accesses, an entry 208 to store memory utilization, an entry 210 to store network interface controller utilization, an entry 212 to store storage interconnect bandwidth utilization for read accesses, and an entry 214 to store storage interconnect utilization for write accesses. Note that in other example implementations, other metrics can be stored in the tuple 200. Examples of other types of metric information that can be included in a tuple include utilization of a front side bus of a node, utilization of a memory bus, utilization of an I/O (input/output) bus, and so forth. Moreover, in other implementations, the entries of the tuples can store metrics having different dimensions.

In a node having multiple CPUs, the CPU utilization metric in entry 202 of the tuple 200 can refer to the collective utilization of the multiple CPUs rather than to individual CPUs. The collective utilization of multiple CPUs can be a simple sum of the utilizations of individual CPUs. CPUs of a node are considered a shared resource, although metrics associated with the CPUs can be individually monitored. A scheduler in the node can move tasks among CPUs without changing the quality of the intended grouping. Consequently, the metrics of the CPUs can be combined for purposes of determining grouping. However, the metrics of the individual CPUs (rather than the collected metric) can be displayed with in the GUI window. In other implementations, metrics for other types of resources in a node can be processed in similar fashion—combine metrics for purposes of grouping but display metrics individually.

In the example of FIG. 2A, the tuple 200 also separates utilization of bandwidth (network interconnect bandwidth or storage interconnect bandwidth) for read accesses and write accesses (entries 204, 206, 212, and 214). In other implementations, segregating bandwidth utilizations for read and write accesses is not performed.

A tuple for a grouped node (representing a group of nodes) has the same format as the tuple 200 of FIG. 2A, except that each entry of the tuple contains a corresponding aggregated metric. For example, the CPU utilization aggregate metric is an aggregate (range, average, minimum, maximum, etc.) of the individual CPU utilization metrics of respective individual nodes in the group. If the aggregated metric is a range, then each entry of the tuple for the grouped node stores a range defined by the minimum and maximum metric values corresponding to the nodes in the group. For example, if the minimum CPU utilization associated with a first node in the group is 55%, and the maximum CPU utilization associated with a second node in the group is 64%, then the range would be [55%, 64%].

Figure 3:
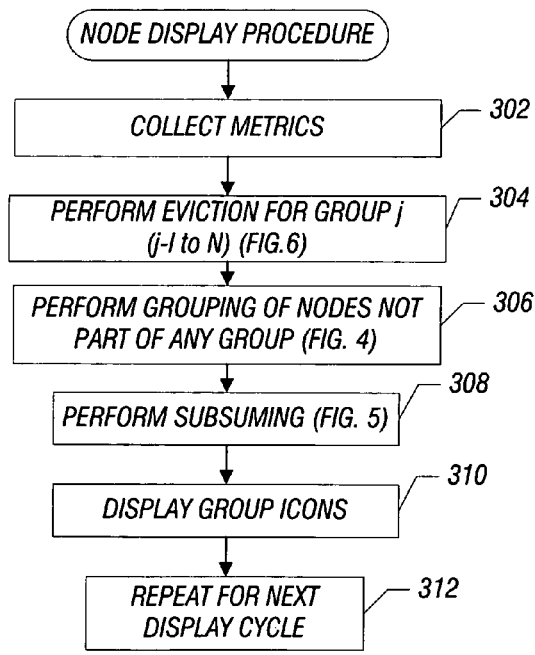
FIG. 3 is a flow diagram of a node display procedure, according to an embodiment.

FIG. 3 shows a flow diagram of a node display procedure executable by the software modules (102, 112, 120, 122) in FIG. 1 to display group icons 126 in the GUI window 124 that relate to grouped nodes that represent corresponding groups of the nodes 106 on the network 110. First, the metrics collector 112 collects (at 302) metrics information from the nodes 106, and stores the metrics information in storage 116 as node metrics information 114. Next, if there are any groups that are in existence, eviction is performed (at 304) by the grouper 102 to evict members from one or more groups that do not belong to their corresponding group(s) based on the members falling out of tolerance with respect to the other members of the group. If there are N (N is an integer) groups, then eviction is performed for each group j, j=1 to N. Eviction is described further in connection with FIG. 6.

Next, grouping of nodes that are not part of any group is performed (at 306). In one embodiment, a tolerance can be defined for a particular metric to determine how close two metrics should be to be considered "close enough" to be part of the same group. For example, a tolerance of 10% would allow a first node having 56% utilization and a second node having 63% utilization to be considered "close enough" to be part of the same group. However, if the first node has a 50% utilization, then that would be outside the tolerance of 10% with respect to the second node's utilization of 63%. In another example, if the 50% utilization and 56% utilization associated with corresponding nodes were encountered first, then the 63% utilization associated with another node would be considered outside the tolerance of the first two utilizations. Thus, grouping of the nodes is dependent upon the order in which the nodes are processed.

Figure 2B:
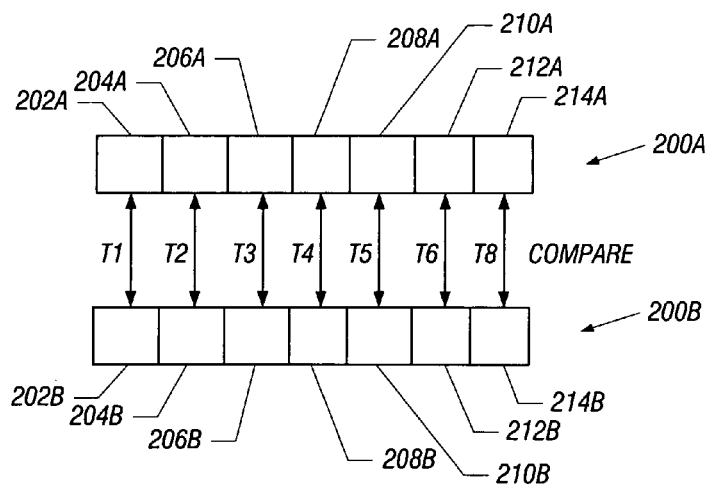
FIGS. 2B-2D illustrate several examples in which tuples corresponding to different nodes are compared, in accordance with some embodiments.

The above example considers just one metric when determining whether the tuples of two nodes are considered to be within tolerance of each other. As discussed above, a tuple can have multiple entries corresponding to different metrics. Thus, to determine whether two tuples are within tolerance of each other such that the nodes corresponding to two tuples can be added to the same group, each metric of one tuple is compared to the corresponding metric of the other tuple to determine whether the two metrics are within tolerance. FIG. 2B shows a comparison between metrics of two example tuples 200A and 200B, where tuple 200A corresponds to node A and tuple 200B corresponds to a node B. In the example of FIG. 2B, metric 202A (the CPU utilization metric) is compared to the corresponding CPU utilization metric 202B of tuple 200B to determine whether metrics 202A and 202B are within tolerance T1 of each other. Similarly, metrics 204A and 204B are compared to each other to determine whether they are within tolerance T2. The same is performed for the remaining pairs of tuples; metrics 206A, 206B compared with respect to tolerance T3; metrics 208A, 208B compared with respect to tolerance T4; metrics 210A, 210B compared with respect to tolerance T5; metrics 212A, 212B compared with respect to tolerance T6; and metrics 214A, 214B compared with respect to tolerance T7. The various tolerances T1-T7 associated with the different metrics can have the same value or can have different values. The two tuples 200A, 200B are considered to be within tolerance if every two corresponding metrics of the tuples 200A, 200B are within tolerance of each other; in other words, metrics 202A, 202B are within tolerance T1; metrics 204A, 204B are within tolerance T2; metrics 206A, 206B are within tolerance T3; metrics 208A, 208B are within tolerance T4; metrics 210A, 210B are within tolerance T5; metrics 212A, 212B are within tolerance T6; and metrics 214A, 214B are within tolerance T7.

In an alternative implementation, a single tuple-wide tolerance can be defined for comparing metrics in tuples.

Figure 2C:
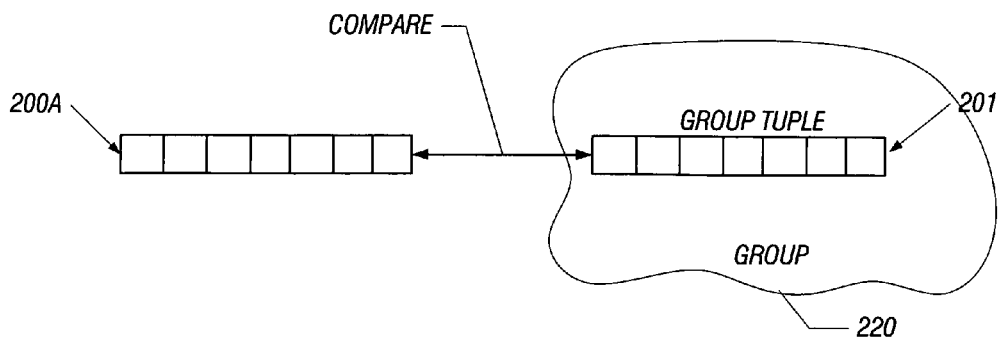

FIG. 2C shows a comparison of metrics in a tuple 200A (associated with a node A that does not belong to any group) with corresponding aggregated metrics of a group tuple 201 associated with group 220. As noted above, the group tuple according to one implementation can include ranges of metric values in each entry of the group tuple. The metrics in tuple 200A are compared to corresponding ranges in the group tuple 201 to determine whether tuple 200A is within tolerance of the group 220. If so, then node A can be added to the group 220. If not, then node A is not added to the group 220.

In embodiments in which the group tuple 201 does not store ranges, then tuple 200A may be compared to tuples of all individual nodes in the group 220 to determine whether tuple 200A is within tolerance.

Figure 2D:
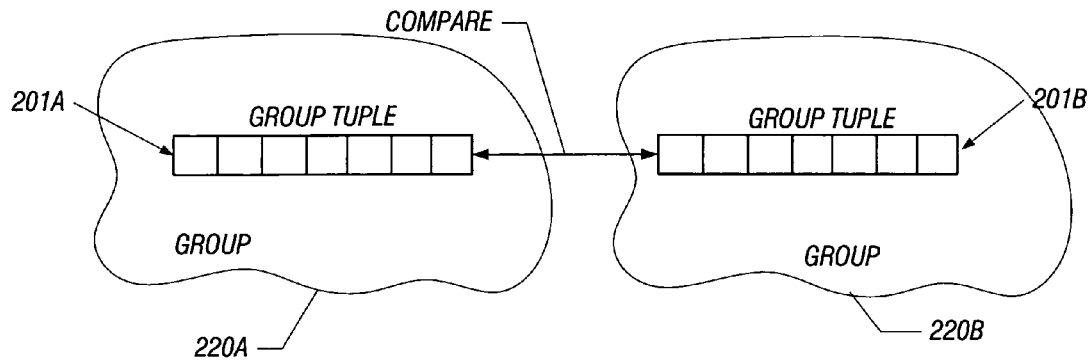

As part of the grouping at 306, new groups can be created (discussed further below) if a particular node cannot properly be added to any existing group. After the grouping performed at 306, subsuming is performed (at 308), where one group can be subsumed into another group when the metrics of the various tuples in the two groups converge such that all tuples within the two groups are within tolerance of every other tuple in the two groups. FIG. 2D illustrates comparisons of a group tuple 201A associated with group 220A with a group tuple 201B associated with group 220B to determine whether the metrics of the two groups 220A, 220B have converged such that the two groups are within tolerance and can be combined. The comparison can be a comparison of the ranges of the corresponding group tuples 201A, 201B. For example, if the CPU utilization metric in group tuple 201A is a range [10%, 15%], and the CPU utilization metric in group tuple 201B is a range [14%, 19%], then the CPU utilizations are within tolerance (assuming tolerance of 10%) since the minimum value 10% in the group tuple 201A is within 10% of the maximum value 19% in group 201B.

In some embodiments, when performing the subsuming at 308, a larger group subsumes the smaller group. A simple example of a scenario where the metrics of various nodes in different groups converge close to each other is when nodes of the two groups become idle. Further details regarding subsuming are described in connection with FIG. 5.

Next, the various groups can be displayed (at 310) as group icons 126 by the GUI control module 122, where the group icons 126 are displayed in the GUI window 124 (FIG. 1). In displaying the group icons, the grouper 102 can read the node metrics information 114 to perform some aggregation with respect to the metrics such that aggregated metric information is displayed with each of the group icons. Alternatively, the aggregated metric information can already be part of the group information 118 that has been pre-computed by the grouper 102.

The process of FIG. 3 can be repeated (at 312) for the next display cycle.

Figure 4:
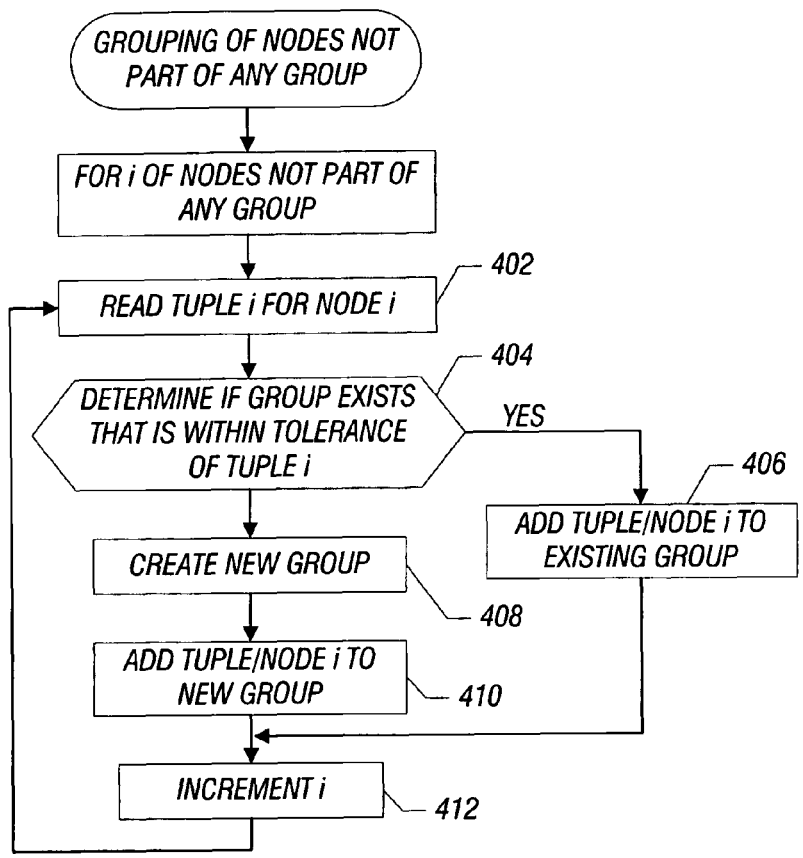
FIG. 4 is a flow diagram of a process of grouping nodes, according to an embodiment.

FIG. 4 is a flow diagram of a process of grouping nodes that are not part of any group (306 in FIG. 3). The grouper 102 iterates through nodes that are not part of any group, which is depicted in FIG. 4 as being a For loop that iterates through nodes i that are not part of any group. Tuple i for node i is read (at 402) by the grouper 102. The grouper determines (at 404) if a group exists that is within tolerance of tuple i (e.g., by comparing the metrics of tuple i with the group tuple of each group). Tuple i is within tolerance of a particular group if each metric of tuple i is within tolerance of the metric range of each corresponding entry of the group tuple. If tuple i is determined to be within tolerance of the group, then tuple/node i is added (at 406) to the existing group. However, if it is determined at 404 that tuple i is not within tolerance of any existing group, then a new group is created (at 408), with tuple i added as the initial member of the new group (at 410). The value of i is incremented (at 412) to the next node that is not part of any group, and the process at 402-410 is repeated.

Figure 5:
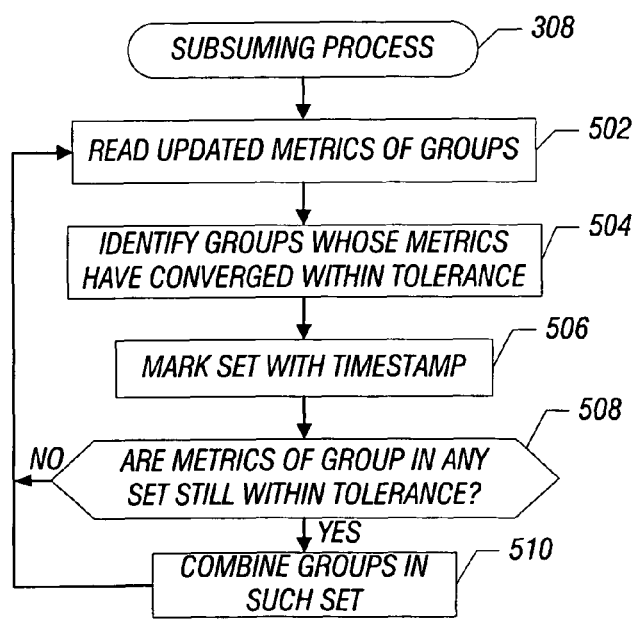
FIG. 5 is a flow diagram of a process of subsuming nodes, according to an embodiment.

FIG. 5 shows the subsuming process (308 of FIG. 3) in greater detail. During operation of the nodes, the metrics of the tuples associated with the nodes are likely to change (such as due to software processes completing or new software processes being invoked). The updated metrics are provided to the metrics collector 112 and stored as node metrics information 114. The subsuming process performed by the grouper 102 (which can be performed by a subsuming subroutine of the grouper 102, for example) is able to read (at 502) updated metrics of the various nodes of the corresponding groups. The subsuming process then identifies (at 504) groups whose metrics have converged within tolerance. In one implementation, two groups converge within tolerance when the metric ranges of the group tuples within the two respective group tuples are within tolerance of each other. For a newly-identified set of groups whose metrics have converged, the newly-identified set is marked (at 506) with a timestamp. This timestamp is used to later determine whether the groups of the set are still within tolerance of each other after some predefined time delay has transpired. Without a delay, nodes of a group that go idle temporarily would immediately be subsumed into an idle group, followed by subsequent eviction within a short period of time when the nodes again become active. Such behavior can be distracting and confusing, and is wasteful of computing resources. A delay allows nodes of a group a chance to stay together should they resume computation.

Note that there may be multiple sets of groups that were previously identified as having converged, where each set is associated with a respective timestamp. The subsuming process checks (at 508), for each such set, if the predefined time delay has passed from the timestamp associated with the set, and if so, if the identified groups within the set are still within tolerance. If the groups of the set are still within tolerance, the groups in the set are combined at 510 (such as by subsuming a smaller group into a larger group in some embodiments).

Figure 6:
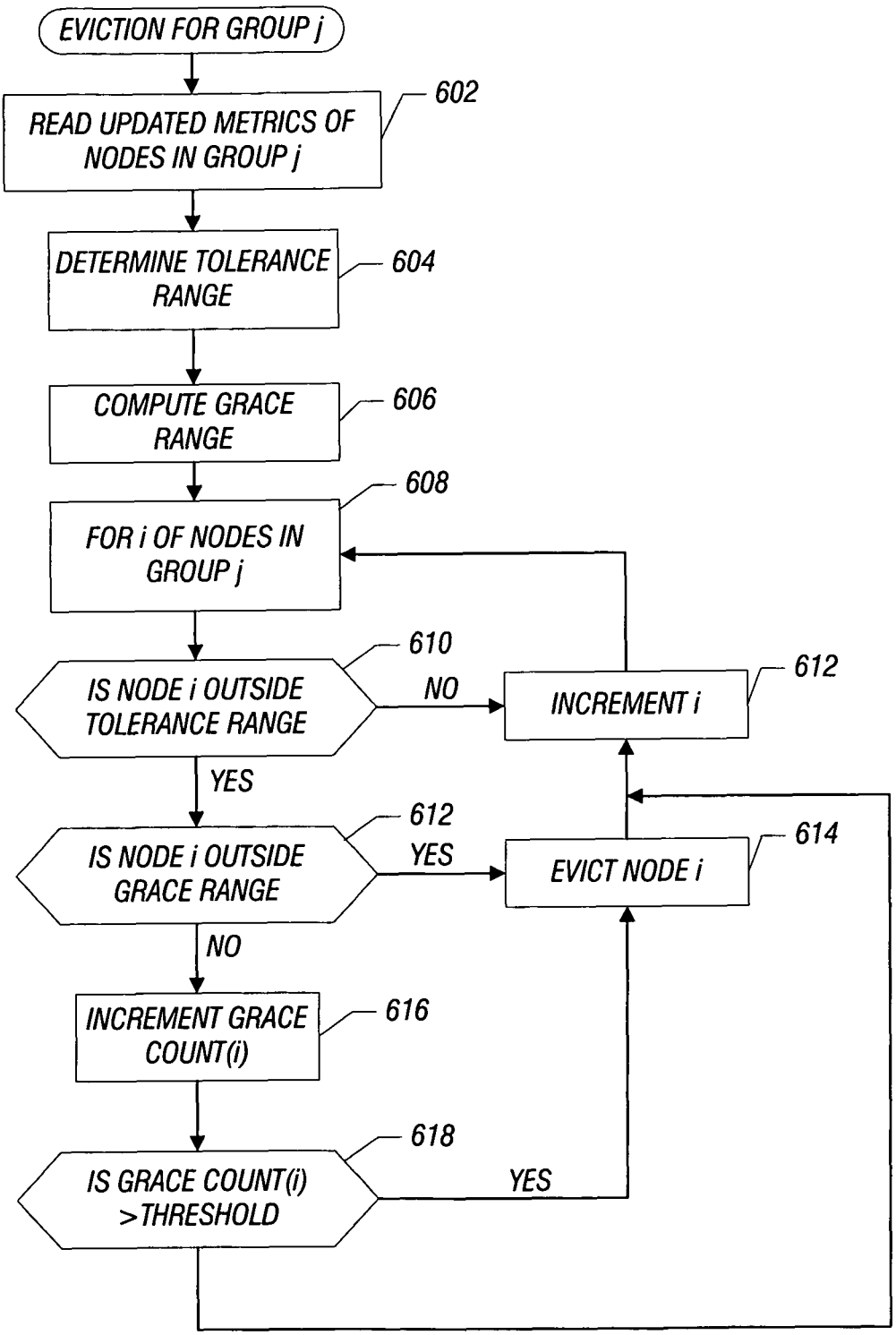
FIG. 6 is a flow diagram of a process of evicting nodes, according to an embodiment.

FIG. 6 shows the eviction process for a particular group j (304 in FIG. 3). The eviction process (which can be performed by an eviction subroutine in the grouper 102, for example) reads (at 602) updated metrics of nodes in group j. The grouper 102 next determines (at 604) the tolerance range for group j. There is a variety of possible different ways to determine a group's new tolerance range as the underlying metrics of nodes change. A first technique involves using the lowest metric value as the anchor, such that any tuples containing higher metric values that are outside of tolerance with respect to the anchor will be evicted. The tolerance range is defined based on the anchor. Alternatively, the highest value of a metric can be used as an anchor. In yet another technique, the medium value or an average value can be used as the anchor.

Next, the grouper 102 computes (at 606) a grace range for group j, where the grace range (used to prevent immediate eviction of a node from a group when the node falls outside the tolerance range) is somewhat larger than the tolerance range (such as by some predefined amount). For example, the tolerance can be set at 10%, while the grace is set at 16%. In such example, the tolerance range is 10% on either side of the anchor, while the grace range is 16% on either side of the anchor. The notion here is that if a metric is outside the tolerance range but within the grace range, then the particular node is not evicted immediately, but rather, is given some chance to drift back within tolerance.

Next, the grouper 102 iterates through all the nodes (nodes i) in group j. For each node i, the grouper 102 determines (at 610) if tuple i for node i is outside the tolerance range for group j. If not, the value of i is incremented (at 612) to the next node i in group j. If tuple i for node i is outside the tolerance range for group j, as determined at 610, then the grouper 102 determines (at 612) if tuple i for node i is outside the grace range. If so, then node i is evicted (at 614) from group j. However, if node i is not outside the grace range, as determined at 612, then a variable GraceCount(i) is incremented (at 616). GraceCount(i) is associated with node i. The value of GraceCount(i) is then compared (at 618) with a threshold to determine if GraceCount(i) is greater than the threshold. If so, then node i can be evicted (at 614). The threshold of step 618 is used to define how many processing cycles node i is allowed to stay outside the tolerance range but within the grace range before node i is evicted.

Figure 7:
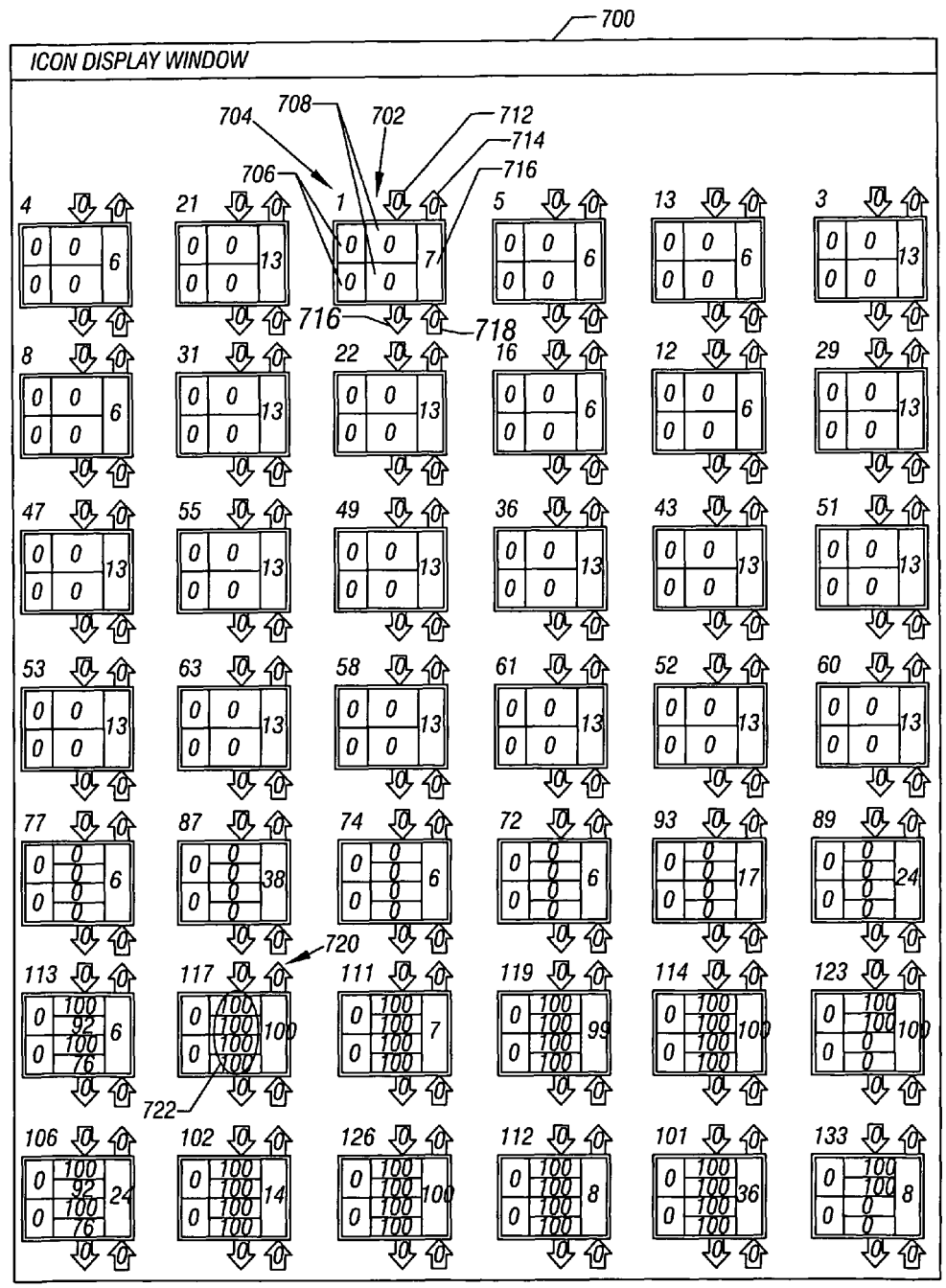
FIG. 7 illustrates icons representing individual nodes prior to grouping in accordance with an embodiment.

FIG. 7 shows a GUI window 700 in which icons corresponding to individual nodes are displayed. A representative one of the icons 702 is described. Note that the window 700 shown in FIG. 7 does not depict group icons according to some embodiments. The individual icon 702, according to the example of FIG. 7, has several elements. A node number 704 (which is "1" in the example) at the upper left corner of the icon 702 identifies the number or identifier of the corresponding node. In the example of FIG. 7, each node has two network interface controllers. Two left boxes 706 in the icon 702 are used to depict utilization values of the two network interface controllers.

In the example, each of some of the nodes has two CPUs (e.g., two processing cores of a duo-core microprocessor). The two boxes 708 in the middle of the icon 702 depict utilizations of the respective two CPUs in the corresponding node. The right box 710 of the icon 702 depicts the memory utilization of the node. At the top of icon 702, an incoming arrow 712 represents the utilization of the network interconnect bandwidth for read accesses, whereas arrow 714 represents network interconnect bandwidth utilization for write accesses.

On the bottom side of icon 702, arrow 716 represents the storage interconnect bandwidth utilization for write accesses, whereas arrow 718 represents storage interconnect bandwidth utilization for read accesses.

Example icon 720 in the GUI window 700 represents a node in which there are four CPUs, with the icon 720 having four boxes 722 representing respective utilizations of the four CPUs (rather than the two CPUs of the node represented by icon 702). Thus, in FIG. 7, two classes of nodes are depicted, with a first class including nodes with two CPUs, and a second class including nodes with four CPUs.

Figure 8:
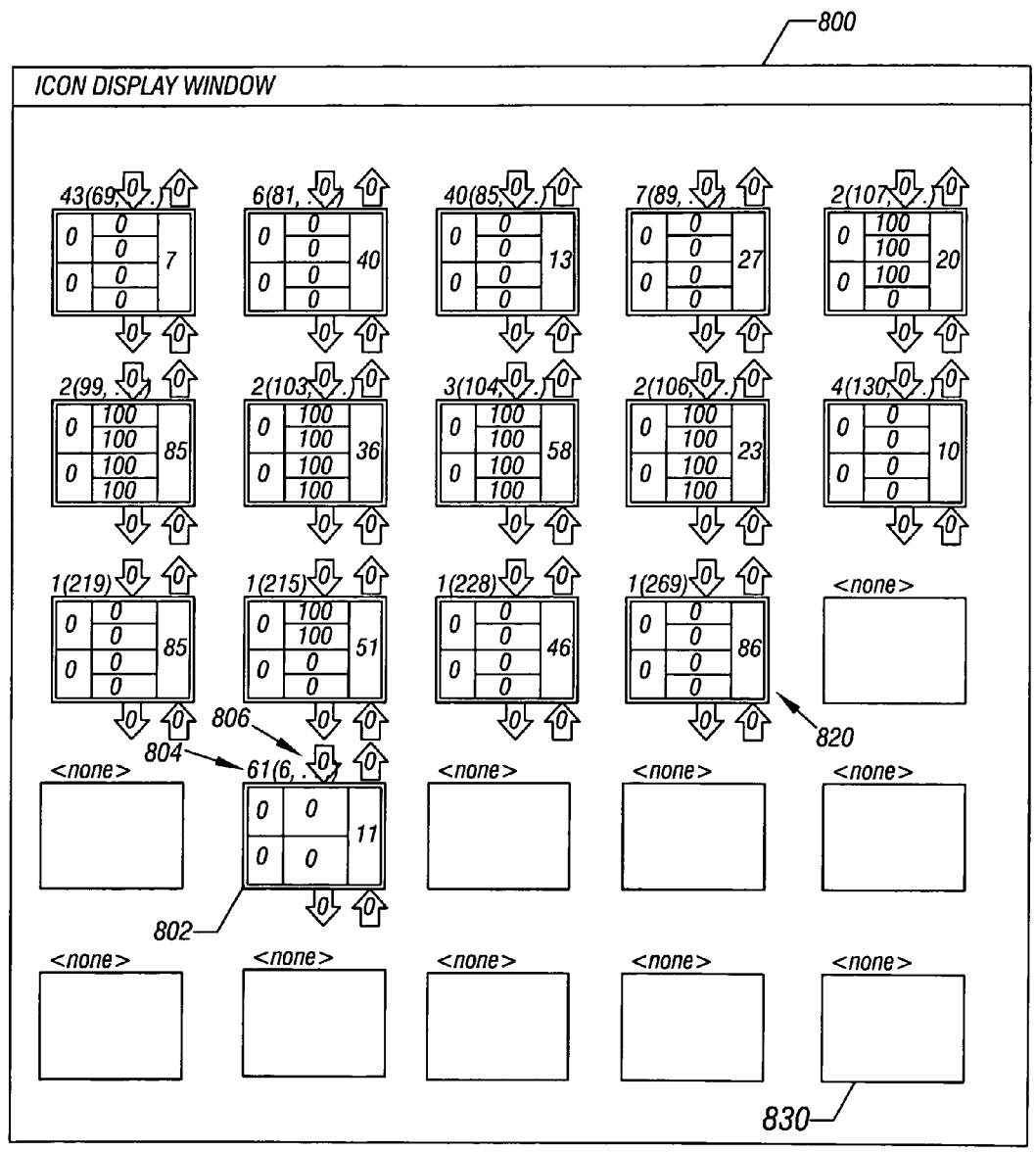
FIG. 8 illustrates group icons representing corresponding groups of nodes, according to an embodiment.

FIG. 8 shows a GUI window 800 (corresponding to GUI window 124 of FIG. 1) that displays group icons. A first example group icon is identified as icon 802. The group icon 802 has a number 804 ("61" in the example) at the left upper corner of the icon 802, where the number 804 represents the number of nodes in the group represented by group icon 802. Following the number 804 is a list 806 (in parentheses) that lists the nodes, by node number, that are part of the group represented by the group icon 802. The structure of group icon 802 is similar to the structure of individual icon 702. The group icon 802 represents a grouped node having plural nodes of the first class (nodes with two CPUs). The remaining group icons depicted in FIG. 8 (such as group icon 820) are used to represent grouped nodes for a second class of nodes (namely, nodes with four CPUs). The various values associated with group icons 802 and 820 can be some aggregated value that represents an aggregation of the corresponding metrics associated with the individual nodes. As discussed above, the aggregation can be any one of an average, median, maximum, minimum, mode, and range.

FIG. 8 also shows some empty boxes, such as empty box 830, which indicates a zero-member group. To create new groups, any one of the zero-member groups can be converted into an actual group icon to represent a corresponding group of nodes.

Instructions of software described above (including grouper 102, metrics collector 112, client application 120, and GUI control module of FIG. 1) are loaded for execution on a processor (such as one or more CPUs 104 in FIG. 1). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or DVDs.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method to display information regarding an arrangement of nodes coupled by a communications network, wherein the nodes are associated with at least one metric, the method comprising:
   defining plural groups of the nodes based on the at least one metric associated with the nodes; and
   displaying group icons to represent the respective groups of nodes;
   wherein defining the plural groups comprises adding a particular node to a particular one of the plural groups based on comparing the at least one metric associated with the particular node with a corresponding at least one aggregated metric associated with the particular group, wherein the at least one aggregated metric associated with the particular group is based on aggregating values of the at least one metric associated with the nodes of the particular group.

2. The method of claim 1, wherein the at least one metric comprises one or more of CPU utilization, network interconnect utilization, storage interconnect utilization, network interface controller utilization, and memory utilization.

3. The method of claim 1, wherein comparing the at least one metric associated with the particular node with the corresponding at least one aggregated metric associated with the particular group comprises comparing a first tuple containing metrics information associated with the particular node with a group tuple containing aggregated metrics information associated with the particular group.

4. The method of claim 1, further comprising:
   receiving updated values of the at least one metric associated with the nodes during operation of the nodes; and
   combining some of the groups in response to values of the at least one metric associated with the nodes in the some groups converging to be within tolerance.

5. The method of claim 1, further comprising:
   receiving updated values of the at least one metric associated with the nodes during operation of the nodes; and
   evicting a given node from a given one of the groups in response to determining that a value of the at least one metric associated with the given node has fallen out of tolerance with respect to other nodes in the given group.

6. The method of claim 5, further comprising:
   defining a tolerance range for the given group,
   wherein determining that the value of the at least one metric associated with the given node has fallen out of tolerance comprises determining that the value of the at least one metric has fallen out of the tolerance range.

7. The method of claim 1, wherein displaying the group icons comprises displaying an aggregated metric associated with each group icon.

8. The method of claim 1, wherein at least two of the nodes are each associated with a tuple containing plural metrics, and wherein defining the plural groups comprises comparing the metrics in the tuple of one node with corresponding metrics in the tuple of the other node, wherein the two nodes are considered part of a group if each compared pair of metrics is within a corresponding tolerance.

9. A method to display information regarding an arrangement of nodes coupled by a communications network, wherein the nodes are associated with corresponding characteristics, the method further comprising:
   defining plural groups of the nodes based on the characteristics associated with the nodes;
   displaying group icons to represent the respective groups of nodes;
   receiving updated characteristics of the nodes during operation of the nodes;
   evicting a particular node from a particular one of the groups in response to determining that a characteristic of the particular node has fallen out of tolerance with respect to other nodes in the particular group;
   defining a tolerance range for the particular group, wherein determining that the characteristic of the particular node has fallen out of tolerance comprises determining that the characteristic has fallen out of the tolerance range;
   defining a grace range that is larger than the tolerance range;
   wherein evicting the particular node form the particular group is in response to the characteristic of the particular node being outside the tolerance range but within the grace range for some predefined period of time.

10. The method of claim 9, further comprising:
    evicting the particular node from the particular group in response to detecting that the characteristic of the particular node is outside the grace range.

11. A computer comprising:
    a processor;
    a metrics collector executable in the processor to receive at least one metric associated with nodes coupled over a communications network;
    a grouper executable on the processor to define groups of the nodes according to the at least one metric associated with the nodes, wherein the grouper is to add a particular node to a particular one of the plural groups based on comparing the at least one metric associated with the particular node with a corresponding at least one aggregated metric associated with the particular group, wherein the at least one aggregated metric associated with the particular group is based on aggregating values of the at least one metric associated with the nodes of the particular group; and a display device to display a graphical user interface window containing group icons representing corresponding groups of nodes.

12. The computer of claim 11, the grouper to further identify plural classes of nodes, wherein the defined groups include groups within each of the classes.

13. The computer of claim 11, wherein the at least one metric comprises one or more of a metric relating to a CPU, a metric relating to a network interconnect, a metric relating to a storage interconnect, a metric relating to a bus, a metric relating to a memory, and a metric relating to a network interface controller.

14. The computer of claim 11, wherein the metrics collector is executable to receive updated values of the at least one metric due to operation of the nodes, and the grouper is executable to update the groups based on the updated values of the at least one metric.

15. The computer of claim 14, wherein the groups are updated by performing one of evicting nodes from groups and combining groups.

16. An article comprising at least one storage medium containing instructions that when executed cause a computer to:
define plural groups of the nodes based on at least one metric associated with the nodes; and
display group icons to represent the respective groups of nodes,
wherein defining the plural groups comprises adding a particular node to a particular one of the plural groups based on comparing the at least one metric associated with the particular node with a corresponding at least one aggregated metric associated with the particular group, wherein the at least one aggregated metric associated with the particular group is based on aggregating values of the at least one metric associated with the nodes of the particular group.

17. The article of claim 16, wherein the at least one metric comprises one or more of a metric relating to a CPU, a metric relating to a network interconnect, a metric relating to a storage interconnect, a metric relating to a bus, a metric relating to a memory, and a metric relating to a network interface controller.

18. The article of claim 17, wherein the instructions when executed cause the computer to further:
receive updated values of the at least one metric due to operation of the nodes; and
update the groups based on the updated values of the at least one metric.

* * * * *